Patented Apr. 5, 1949

2,466,004

UNITED STATES PATENT OFFICE 2,466,004

2'-KETO - 3,4 - IMIDAZOLIDO-2-THIOPHENE-VALERIC ACID AND METHODS FOR OBTAINING THE SAME

Lee C. Cheney and John Robert Piening, Detroit, Mich., assignors to Parke, Davis & Company, Detroit, Mich., a corporation of Michigan No Drawing. Application December 23, 1944, Serial No. 569,640

20 Claims. (Cl. 260—309)

This invention relates to new compounds and methods for preparation of the same, said compounds having the general formula,

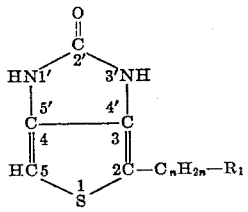

where $n=1$ to 8 and the alkyl chain, $—C_nH_{2n}$, may be straight or branched, and where $R_1$ is a radical of the class —COOH, —COOM, —COOR', alkoxy, aralkoxy and aryloxy, R' being lower alkyl and M representing a salt-forming basic group or metal such as sodium or other alkali metal, alkaline earth metal, magnesium, ammonium and substituted ammonium, such as monoalkylammonium and dialkylammonium.

These compounds are useful intermediates for the synthesis of pharmaceuticals, and they are particularly useful as intermediates for the preparation of compounds possessing biotin and possibly anti-biotin activity.

We have discovered that these compounds may be synthesized from 3-amino-4-carboalkoxy-2-(ω-substituted-alkyl)-thiophenes, which are prepared by methods disclosed in our copending application Serial No. 569,639, filed on even date herewith, now Patent No. 2,443,598, issued June 22, 1948. We have found that this can be done by acylating the latter 3-amino compounds to form the corresponding 3-acylamino - 4 - carboalkoxy-2-ω-R-alkylthiophenes, by then reacting the latter compounds with hydrazine hydrate, preferably under conditions removing water as fast as formed, to get the corresponding 3-acylamino-2 - ω -R - alkyl-4-thiophenecarboxylic acid hydrazides, by treating the latter compounds with nitrous acid to form the corresponding 3 - acylamino-2-ω-R-alkyl-4-thiophenecarboxylic acid azides, by refluxing the latter compounds with alcohols to form the corresponding 3-acylamino-4-carboalkoxyamino-2-ω- R - alkyl-thiophenes, by hydrolyzing the latter compounds to form the corresponding 3,4-diamino-2-ω-R-alkylthiophenes and by finally reacting the latter diamino compounds with phosgene or equivalent carbonyl containing compound to form the corresponding 2'-keto-3,4-imidazolido-2- ω - R - alkyl-thiophenes. These steps may be pictured by the following:

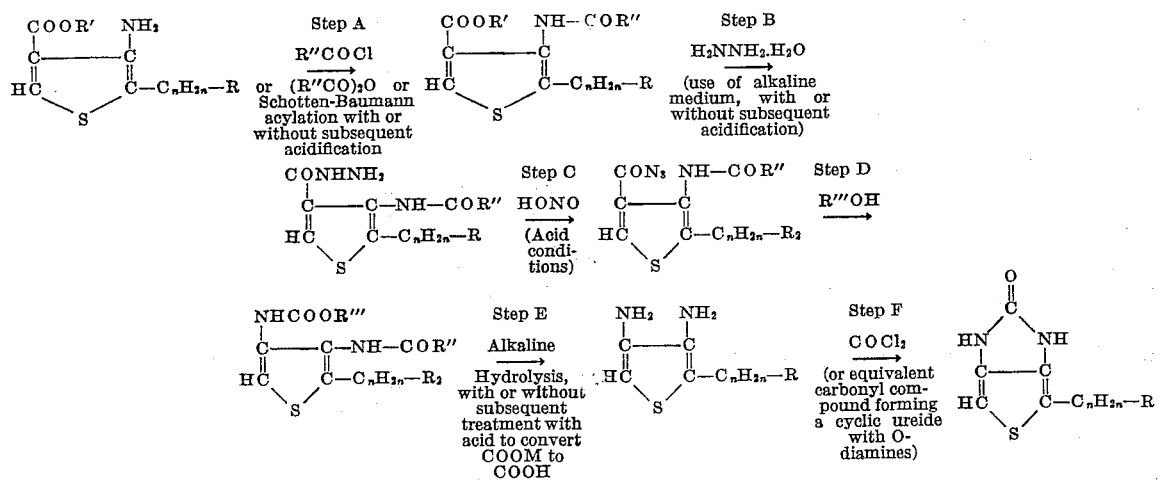

R in these formulas represents a radical of the class —COOH, —COOM, alkoxy, aralkoxy and aryloxy, where M is a salt-forming basic group or metal. R' is lower alkyl, R"CO— is an organic carboxylic acid acyl radical and R''' is lower alkyl (including lower cycloalkyl) or aryl-substituted lower alkyl, and $R_2$ is a radical of the class —COOH, alkoxy, aralkoxy and aryloxy.

By acidification with strong mineral acid, a salt form of the final bicyclic product can be converted to the acid, the radical —COOM being changed to —COOH. Conversely, this —COOH is converted back into —COOM by exactly equivalent amount of base. Also, by esterification methods which do not disrupt either of the two rings, this group —COOH can be converted to —COOR′. For example, the bicyclic acid can be treated with diazomethane to give the methyl ester. Other diazo alkanes can be used to get other alkyl esters. Any other known esterification procedure can be used which leaves the ring systems intact. Thus, it is possible to prepare all of the new compounds of the general formula first given above.

The following examples illustrate the invention.

*Example 1*

*3-benzoylamino-4-carbethoxy-2-thiophenevaleric acid.*—A cooled solution of 2.71 g. (0.01 mole) of 3-amino-4-carbethoxy-2-thiophenevaleric acid in 25 ml. of dry chloroform is treated with 1.4 ml. of benzoyl chloride. The mixture is protected by a calcium chloride tube and refluxed on the steam bath for 24 hours. Following removal of solvent by steam distillation, the residual brown oil is dissolved in ether, and the ether solution is extracted thrice with 5% sodium bicarbonate solution. The combined alkaline extracts are cooled, acidified to Congo red with dilute hydrochloric acid and extracted twice with ether. Combined ether extracts are dried with anhydrous sodium sulfate, the ether is evaporated and the residue is shaken with 200 ml. of petroleum ether (B. P. 35–60° C.) for the removal of benzoic acid. The resulting light tan solid is filtered. Recrystallization from dilute alcohol yields 2.77 g. (81%) of cream-colored needles, M. P. 126.5–127.5° C., having the formula

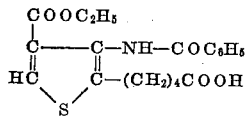

Anal.: Calcd. for $C_{19}H_{21}O_5NS$: C, 60.77; H, 5.63. Found: C, 60.70; H, 5.53.

*3-benzoylamino-2 - Δ - carboxybutyl - 4 - thiophenecarboxylic acid hydrazide.*—A mixture of 1.10 g. (0.00293 mole) of 3-benzoylamino-4-carbethoxy-2-thiophenevaleric acid and 0.308 g. (0.00308 mole) of potassium bicarbonate is warmed with 25 ml. of 50% alcohol until solution is complete. Solvent is distilled at reduced pressure, leaving the potassium salt which is desiccated overnight in vacuo over phosphorus pentoxide. This dry salt is dissolved in 10 ml. of warm absolute alcohol, treated with 10 ml. of dry benzene and 2 ml. of 100% hydrazine hydrate, protected by a calcium chloride tube and refluxed on the steam bath for 16 hours under a Soxhlet extractor containing 25 g. of anhydrous calcium sulfate in its thimble. Solvent and excess hydrazine hydrate are distilled at reduced pressure, leaving a fluffy mixture consisting mainly of the potassium salt of 3-benzolyamino-2-Δ-carboxybutyl-4-thiophenecarboxylic acid hydrazine along with some potassium salt of unchanged 4-carbethoxy compound. The mixture is dissolved in 30 ml. of water. A yellow aqueous solution is obtained which can be mixed with inert water immiscible organic solvent, such as ether, and then acidified with a lower aliphatic carboxylic acid, such as acetic or propionic acid, whereby unchanged starting material goes into the ether solution but the desired 4-thiophenecarboxylic acid hydrazide is insoluble in the ether as well as the aqueous phase and can be filtered off. Thus, the yellow solution is covered with 30 ml. of ether and is made almost neutral to litmus with 5% hydrochloric acid solution. The ether of the resulting mixture serves to dissolve unchanged 4-carbethoxy starting material. The mixture is acidified with 10% acetic acid solution until no more precipitate forms. The mixture is stirred and cooled, and the white crystalline solid filtered off and dissolved in a minimum of boiling water, digested with activated charcoal, filtered and cooled. The fine, white crystals which separate weigh 0.95 g. (90% yield), and melt at 140–141° C. The formula of the compound is

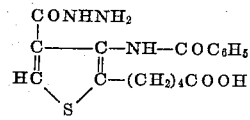

Anal.: Calcd. for $C_{17}H_{19}O_4N_3S$: C, 56.49; H, 5.30. Found: C, 56.40; H, 5.57.

In this example water is liberated when the hydrazine hydrate reacts. The water liberated is quickly carried into the refluxing vapors and by them into contact with the anhydrous calcium sulfate in the thimble and thereby removed from the reactants. The mixture of dry benzene with alcohol facilitates the removal of the water. Such procedure for removing water is important, since its use almost doubles the yield of hydrazide over that obtained when using alcohol in the absence of the benzene and the anhydrous calcium sulfate.

*3 - benzoylamino-2-Δ-carboxybutyl - 4 - thiopheneboxylic acid azide.*—After dissolving 0.625 g. (0.00173 mole) of 3-benzoyl-amino-2-Δ-carboxybutyl-4-thiophenecarboxylic acid hydrazide in 5 ml. of glacial acetate acid by the application of heat, the well-stirred solution is cooled in an ice bath and treated with 0.2 ml. of concentrated hydrochloric acid. To the solid white precipitate thus formed is then added dropwise during five minutes a solution of 0.130 g. (0.00188 mole) of sodium nitrite in 3.5 ml. of water, and 1.5 ml. of water is used as a rinse. The hydrazide completely dissolves and the azide soon begins to precipitate. After one hour 25 ml. of water is added dropwise to effect complete precipitation and the mixture is stirred at 0° C. for an additional hour. The white azide is collected by suction, washed thoroughly with ice water and desiccated in vacuo over phosphorus pentoxide. It weighs 0.56 g. (87% yield) and decomposes at 99–100° C. Its formula is

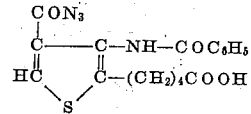

Anal.: Calcd. for $C_{17}H_{16}O_4N_4S$: C, 54.83; H, 4.33. Found: C, 55.11; H, 4.53.

*3-benzoylamino-4-carbethoxyamino - 2 - thiophenevaleric acid.*—A mixture of 0.51 g. of 3-benzoylamino-2-Δ-carboxybutyl - 4 - thiophenecarboxylic acid azide and 50 ml. of absolute alcohol is protected by a calcium chloride tube and refluxed on the steam bath for 17 hours. Excess alcohol is distilled at reduced pressure, the solid residue consisting mainly of the desired 4-carbethoxyamino derivative is dissolved in ether and the ether solution is extracted twice with 5% sodium bicarbonate solution. Acidification of the combined alkaline extracts with dilute hydrochloric acid precipitates 0.49 g. of light brown solid which is collected and recrystallized from dilute alcohol to yield 0.41 g. (76.7%) of colorless crystals, M. P. 156.5–157.5° C., having the formula

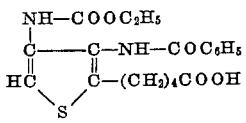

Anal.: Calcd. for $C_{19}H_{22}O_5N_2S$: C, 58.44; H, 5.68.
Found: C, 58.88; H, 5.72.

*2'-keto-3,4 - imidazolido - 2 - thiophenevaleric acid.*—A mixture consisting of 0.30 g. of 3-benzoylamino-4-carbethoxyamino-2 - thiophenevaleric acid, 4.0 g. of C. P. potassium hydroxide and 14 ml. of reagent methanol is placed under an atmosphere of purified nitrogen and refluxed on the steam bath for 12 hours. Methanol is distilled under reduced pressure through the twelve-inch bulb condenser while conducting steam through its jacket and heating the mixture on the steam bath for forty minutes. The resulting white residue consists of the potassium salt of 3,4-diamino-2-thiophenevaleric acid and has the formula,

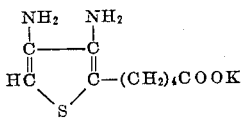

It is readily converted to the free diamino acid (replacing K in the formula by H) by reaction with a lower aliphatic carboxylic acid in absence of air, oxygen or like oxidizing atmosphere. A strong non-oxidizing non-reducing mineral acid may also be used. If the latter acid is used in sufficient quantities one obtains the mineral acid addition salts, either the mono-acid salts or the di-acid salts where one or two of the amino groups have reacted respectively. Thus, using hydrochloric acid, one can obtain either of the following acid addition salts.

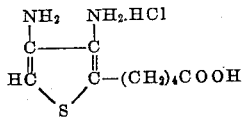

and

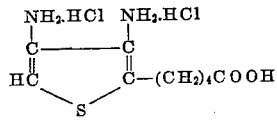

The white residue of potassium salt of 3,4-diamino-2-thiophenevaleric acid is cooled in an ice-salt bath, the atmosphere of nitrogen is restored and 30 ml. of cold water is poured down the barrel of the condenser. Phosgene is then slowly introduced through a tube extending through the condenser to the bottom of the flask while the brown solution is well shaken in the ice-salt bath throughout the addition. In one-half hour the mixture is colorless and acid to Congo red. The precipitated solid is collected and consists essentially of the desired 2'-keto-3,4-imidazolido-2-thiophenevaleric acid containing benzoic acid and some colored impurities. It is dissolved in 5% potassium hydroxide solution, boiled with activated charcoal and filtered. Acidification to Congo red with dilute hydrochloric acid again precipitates the imidazolido acid as a light brown solid which is dried, pulverized and well shaken with 60 ml. of petroleum ether (B. P. 35–60° C.) to remove benzoic acid.

Recrystallization from dilute alcohol following treatment with activated charcoal yields 94 mg. (52%) of pale yellow needles, M. P. 253–254° C., having the formula,

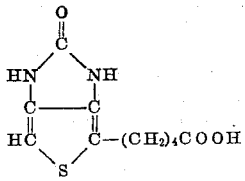

Anal.: Calcd. for $C_{10}H_{12}O_3N_2S$: C, 49.98; H, 5.03.
Found: C, 50.33; H, 5.25.

*Example 2*

*Ethyl 3-benzoylamino - 2 - γ-phenoxypropyl-4-thiophenecarboxylate.*—To a warm solution of 14.1 g. (0.046 mole) of 3-amino-4-carbethoxy-2-γ-phenoxypropylthiophene, M. P. 56–57° C. in 100 ml. of glacial acetic acid is added 100 ml. of a saturated solution of sodium acetate. The well-stirred suspension is cooled in an ice bath and 8 ml. (9.7 g.) (0.069 mole) of benzoyl chloride is added dropwise. Lumps of solid soon separate. After stirring for 40 minutes the suspension is filtered and washed with ice water. The granular product is dissolved in 180 ml. of hot glacial acetic acid, treated with 70 ml. of a saturated solution of sodium acetate, cooled in ice and again treated with 8 ml. of benzoyl chloride. As soon as the suspension solidifies the ice bath is removed, 50 ml. of water is added and the mixture is stirred at room temperature for 3.5 hours. Then 100 ml. of water is added and the suspension is cooled, filtered, washed with cold water and desiccated in vacuum over $P_2O_5$. Crystallization from alcohol following Darco treatment produces 15.7 g. (83% yield) of fine ivory crystals, M. P. 97–98° C. A sample of the compound is recrystallized from alcohol (Darco) as colorless needles, M. P. 98–99° C.

Anal.: Calcd. for $C_{23}H_{23}O_4NS$: C, 67.5; H, 5.66.
Found: C, 67.38; H, 5.91.

Its formula is,

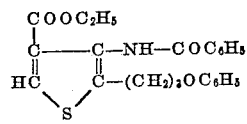

*3-benzoylamino - 2 - phenoxypropyl - 4-thiophenecarboxylic acid hydrazide.*—A mixture of 14.6 g. (0.0357 mole) of ethyl 3-benzoylamino-2-γ phenoxyproply-4-thiophenecarboxylate, 100 ml. of absolute alcohol and 25 ml. of 85% hydrazine hydrate is refluxed for 16 hours on the steam bath. During the night white crystals separate from solution. After removal of excess hydrazine by distillation at reduced pressure, the crystalline mass is boiled with about 700 ml. of absolute alcohol, cooled in an ice-salt bath and filtered. Following desiccation the fine lustrous crystals melt at 186.5–187.5° C. The yield is 13.1 g. or 93% of the theoretical.

Anal.: Calcd. for $C_{21}H_{21}O_3N_3S$: C, 63.8; H. 5.34.
Found: C, 63.77; H, 5.29.

Its formula is,

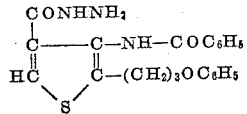

*3-benzoylamino - 2 - γ-phenoxypropyl-4-thiophenecarboxylic acid azide.*—After dissolving 7.91 g. (0.020 mole) of the corresponding hydrazide, M. P. 186.5–187.5° C. in 200 ml. of glacial acetic acid by the application of heat, the well-stirred solution is cooled in an ice bath and treated with 2.25 ml. of cencentrated HCl. A fine, white precipitate of the hydrochloride forms immediately. Then a solution of 1.50 g. (0.0217 mole) of sodium nitrite in 35 ml. of water is added dropwise during 7 minutes and the reaction mixture is stirred in the ice bath for 2.3 hours. Following filtration the white, finely crystalline azide is washed with 150 ml. of ice water and desiccated overnight in vacuum over $P_2O_5$; decomposition point, 108–109° C.; weight, 7.1 g.

Anal: Calcd, for $C_{21}H_{18}O_3N_4S$: C, 61.9; H, 4.46; N. 13.79.

Found: C, 62.30; H, 4.24; N, 13.78.

Its formula is,

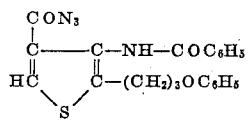

*3 - benzoylamino-4-carbethoxyamino-2-γ-phenoxypropylthiophene.*—One gram (0.00246 mole) of 3-benzoylamino-2- γ -phenoxypropyl-4-thiophenecarboxylic acid azide, decomposition point 108–109° C., is refluxed with 100 ml. of absolute alcohol for five hours while a calcium chloride tube excludes moisture. After concentration to a volume of 45 ml., water is added to make the total volume 125 ml. Cooling in an ice-salt bath, filtration and desiccation yield 1.04 g. (quantitative yield) of fine white needles M. P. 144–145° C. Recrystallization of a sample from alcohol produce silky needles, M. P. 146–146.5° C.

Anal.: Calcd. for $C_{23}H_{24}O_4N_2S$: C, 65.1; H, 5.70.
Found: C, 65.31; H, 5.81.

Its formula is,

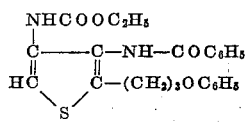

*2'-keto-3,4-imidazolido-2-γ-phenoxypropylthiophene.*—Under an atmosphere of nitrogen a mixture of 2.50 g. (0.0059 mole) of 3-benzoylamino - 4 - carbethoxy-amino-2-γ-phenoxypropylthiophene, 31 g. of C. P. KOH and 85 ml. of methanol is refluxed on the steam bath for 22.5 hours. Solvent is distilled at reduced pressure, after which the atmosphere of nitrogen is reestablished and the pale pink residue of 3,4-diamino-2-γ-phenoxypropylthiophene is cooled in an ice-salt bath and suspended in 200 ml. of water. After phosgene has been slowly bubbled into the suspension for 45 minutes the medium is acid to litmus. Decantation leaves a brown semisolid which is dissolved in 400 ml. of boiling 5% KOH solution, treated with Darco and filtered. Cooling and saturation of the brown filtrate with $CO_2$ precipitate a light brown solid. The original solution is rendered alkaline with KOH, cooled and saturated with $CO_2$. Filtration and desiccation yield 1.16 g. (71.8%) of light brown powder, M. P. 172–173.5° C. Recrystallization from alcohol produces pale yellow crystals, M. P. 174–174.5° C.

Anal.: Calcd. for $C_{14}H_{14}O_2N_2S$: C, 61.3; H, 5.14.
Found: C, 61.40; H, 5.09.

Its formula is,

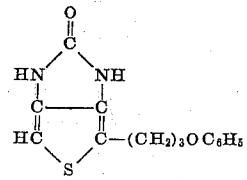

*Example 3*

*Ethyl 3-benzoylamino - 2 - γ-benzyloxypropyl-4-thiophenecarboxylate.*—A mixture of 2.79 g. (0.00875 mole) of 4-carbethoxy-3-amino-2-γ-benzyloxypropylthiophene, 13 ml. of dry chloroform and 1.2 ml. of benzoyl chloride is refluxed on the steam bath for 17 hours. The chloroform is removed by steam distillation. The water is poured from the oil after cooling. The oil is dissolved in alcohol and is given a treatment with Darco. The alcohol solution is concentrated after filtering from Darco and is treated with hot water until a faint turbidity remains. When cool, an oil separates out. Addition of a large volume of water precipitates more oil. After scratching and cooling for several hours the product begins to crystallize, yielding a tan material which is collected, dried and weighed. The weight of crude material is 3.4 g., yield 92%, M. P. 60° C. A sample is recrystallized three times from 80% ethanol to a melting point of 65–66° C.

Anal.: Calcd. for $C_{24}H_{25}O_4NS$: N, 3.31%.
Found: N, 3.44%.

Its formula is,

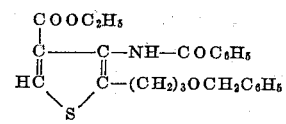

*3-benzoylamino - 2-γ-benzyloxypropyl-4-thiophene-carboxylic acid hydrazide.*—A mixture of 2.96 g. (0.007 mole) of 4-carbethoxy-3-benzoylamino-2-γ-benzyloxypropylthiophene, 20 ml. of absolute alcohol and 5 ml. of 85% hydrazine hydrate is refluxed on the steam bath for 16 hours. The solution is cooled in an ice bath. After several hours a flocculent mass of crystals has formed. These are collected and dried. Weight, 0.64 g., M. P. 116–117° C. The filtrate is warmed and diluted with a large volute volume of water. Cooling and stirring produces further crystals of crude hydrazide. Weight, 1.89 g.

Anal: Calcd. for $C_{22}H_{23}O_3N_3S$: N, 10.26%.
Found: N, 10.07%.

Its formula is,

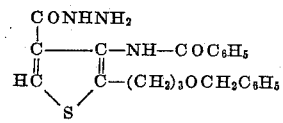

*3 - benzoylamino - 2 - γ - benzyloxypropyl - 4 - thiophenecarboxylic acid azide.*—A solution of 2.43 g. (0.00594 mole) of 3-benzoylamino-2-γ-benzyloxypropyl-4-thiophenecarboxylic acid hydrazide is made in 25 ml. of glacial acetic acid. The solution is cooled in an ice bath until the acetic acid crystallizes. The ice bath is removed and the acetic acid is allowed to melt again before adding 0.67 ml. of concentrated HCl. The flask is returned to the ice bath and while the solution is being stirred vigorously it is treated with a solution of 0.446 g. (0.00646 mole) of NaNO₂ in 10.5 ml. of water. The addition is dropwise over a period of three minutes. The solution becomes turbid but no crystals form. After stirring for an hour, water is added dropwise until a white turbidity remains. This disappears and a dark oil forms. More water is added in this manner until finally white crystals begin to form. The mixture is stirred another hour before filtering off the crystals. These are washed thoroughly with ice water and then are dried over P₂O₅ in a vacuum desiccator for 20 hours. Weight of crude azide is 2.15 g., yield 86%, M. P. 62–64° C.

Its formula is,

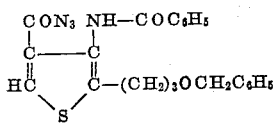

*3 - benzoylamino - 2 - γ - benzyloxypropyl-4-carbethoxyaminothiophene.*—A solution of 2 g. (0.00475 mole) of azide in 30 ml. of absolute alcohol is refluxed on the steam bath for 7 hours. The brown solution is treated with Darco and then filtered. A pale yellow solution results. This is concentrated to ½ volume. Water is added until a turbidity remains. Cooling and stirring produce no crystals. More water is added and an oil precipitates from the milk-like suspension. Cooling in an ice bath hardens the oil. More water is added until about 5 times the original volume of alcohol has been added. Stirring causes crystals to form. After standing overnight in the ice box the soft crystals are filtered and dried. Weight, 1.87 g., yield 89%, M. P. of crude material 75–85° C. The product is crystallized from dilute alcohol (2 vols. alcohol to 1 of water). Beautiful white needles are obtained which melt at 88–89° C. Weight, 1.34 g. A sample is recrystallized and melts at 90–91° C.

Anal.: Calcd. for C₂₄H₂₆O₄N₂S: N, 6.38%.
Found: N, 6.41%.

Its formula is,

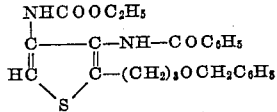

*2'-keto-3,4-imidazolido - 2 -γ-benzyloxypropylthiophene.*—Under an atmosphere of "prepurified" nitrogen a mixture of 0.5 g. (0.00114 mole) of 3-benzoylamino-2-γ-benzyloxypropyl - 4 - carbethoxy aminothiophene, M. P. 88–89° C., 6 g. of C. P. KOH and 20 ml. of pure methanol is refluxed on the steam bath for 16 hours. Steam is substituted for cold water in the 12-inch bulb reflux condenser and reduced pressure (water aspirator) is employed for the removal of the methanol. The very pale pink cake of 3,4-diamino-2-γ-benzyloxypropylthiophene is cooled in an ice-salt bath, provided with an atmosphere of nitrogen and dissolved by the addition of 50 ml. of ether and 50 ml. of water. A slow stream of phosgene is bubbled into the well-shaken, cooled solution until the ether phase becomes colorless, which requires 35 minutes. At this point the aqueous layer is weakly basic to universal indicator and some brown solid has separated. A stream of carbon dioxide is then introduced to eliminate excess phosgene and to saturate the suspension. The product is taken up in a large volume (200 ml.) of ether and solvent is removed on the steam bath. The residual brown oil is treated with Darco, boiled with 25 ml. of 5% KOH solution and filtered, 10 ml. of hot alkali being employed as a rinse. The dark brown filtrate is cooled, made just acid to litmus with dilute HCl and the precipitated light brown amorphous solid is collected and desiccated, weight, 0.298 g., M. P. 119–124° C. Recrystallization by dissolving in absolute alcohol, digesting with Darco, filtering and diluting with water produce 0.231 g. (70.3% yield) of fine, colorless needles, M. P. 127–127.5° C.

Anal.: Calcd. for C₁₅H₁₆O₂N₂S: N, 9.71.
Found: N, 9.66.

Its formula is,

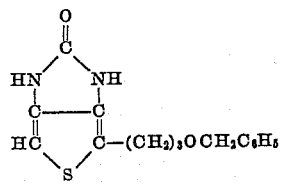

*Example 4*

To 240 mg. of 2'-keto-3,4-imidazolido-2-thiophenevaleric acid is added 10 ml. of 0.1 N sodium hydroxide solution. Upon warming the mixture a clear solution is formed which is distilled under reduced pressure to obtain sodium 2'-keto-3,4-imidazolido-2-thiophenevalerate as an ivory residue.

The 3-amino-4-carbethoxy-2-thiophenevaleric acid used in Example 1 as a starting material can be made from ethyl 3-amino-4-carbethoxy-2-thiophenevalerate of M. P. 43–44° C., as described in our above mentioned patent No. 2,443,598. This 44° C. melting compound is prepared from the oxime of ethyl 4-carbethoxy-3-keto-2-tetrahydrothiophenevalerate by treatment of a dry ether solution of the latter with dry hydrogen chloride gas, converting the amine hydrochloride to the amine with alkali bicarbonate, and finally partially hydrolyzing the amine to the monoester. The oxime mentioned is made from ethyl 4-carbethoxy-3-keto - 2 - tetrahydrothiophenevalerate and hydroxylamine hydrochloride by the known procedure for producing oximes from their corresponding ketones. The 3-keto compound is, in its turn, made from the action of dry sodium ethylate in dry benzene on β-carbethoxyethyl-α,ω-dicarbethoxyamyl sulfide of formula,

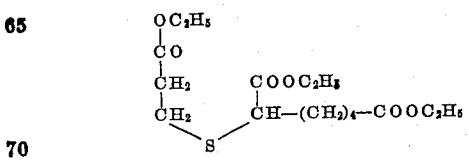

The cyclic 3-keto compound can be purified by way of its copper chelate salt.

The above mentioned sulfide is obtainable by reacting an alkaline solution of β-mercaptopropionic acid with α-chloropimelic acid. The α-chloropimelic acid is obtained by first reacting a solution of sodium ethyl malonate with ethyl Δ-chlorovalerate and hydrolyzing the triester obtained into Δ-carboxybutylmalonic acid, thereafter using sulfuryl chloride to convert the butylmalonic acid compound to Δ-carboxybutyl-chloromalonic acid which can be decarboxylated by heat to α-chloropimelic acid of formula,

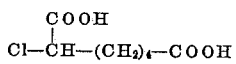

All of the above reactions for making the intermediate of Example 1 and also analogous intermediates for the other examples are described in our copending applications, Serial No. 550,483 and Serial No. 550,484, filed August 21, 1944, and Serial No. 551,619, filed August 28, 1944.

Numerous variations from the above examples, which are nevertheless within the scope of the invention, will occur to those skilled in the art. For example, in the first step wherein the 3-amino group is converted to an amide group, any suitable organic carboxylic acid acylating agent may be used, such as acetyl chloride, acetic anhydride, phenyl acetyl chloride, naphthoyl chloride as well as benzoyl chloride.

Instead of using ethyl alcohol to convert the azide to its carbethoxy-amino derivative, one may use any other lower alkyl (or cycloalkyl) alcohol or aryl substituted lower alkyl alcohol such as benzyl alcohol or phenyl ethyl alcohol.

Phosgene is used in the above examples to form a cyclic ureide from the ortho-diamine, but any other carbonyl containing compound capable of reacting with ortho diamines to form cyclic ureides may be used, such as diethyl carbonate or urea under pressure, ethyl carbamate, ethyl chlorocarbonate and the like. All of these carbonyl compounds have the formula

where X and Y are the same or different members of the class alkoxy, amino and halogen. A condensation of the carbonyl compound occurs with the two ortho amino groups whereby HX and/or HY are eliminated. The condensation occurs under acid or alkaline conditions, depending upon the carbonyl compound used or the conditions or both. In general, the conditions under which the condensation occurs with the different carbonyl compounds are known in the art, and are substantially the same as have been described for such carbonyl compounds when reacting with ordinary ortho diamines. However, there was no way of knowing that the particular new diamines having a thioether ring system described herein for the first time would so react and give the desired bicyclic compounds.

Some of the subject matter originally disclosed and claimed herein is now being claimed in our divisional applications, filed April 8, 1946, Serial Nos. 660,402, 660,403, 660,404, and 660,405. Attention is also called to certain related copending applications in addition to those heretofore mentioned, as follows: Serial No. 577,155, filed February 9, 1945; Serial No. 610,686, filed August 13, 1945; Serial No. 610,687, filed August 13, 1945, and Serial No. 658,874, filed April 1, 1945.

What we claim as our invention is:

1. The process of preparing a 2′-keto-3,4-imidazolido-2-(ω-R-substituted alkyl)-thiophene of formula,

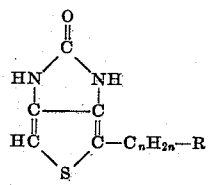

which comprises acylating a 3-amino-4-carboalkoxy-2-(ω-R-substituted alkyl)-thiophene of formula,

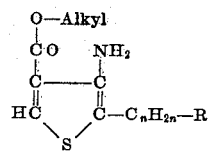

with an organic carboxylic acid acylating agent to form the corresponding 3-acylamino-4-carboalkoxy-2-(ω-substituted alkyl)-thiophene, reacting the latter compound with hydrazine to eliminate water and form the corresponding 3-acylamino-2-(ω-substituted alkyl)-4-thiophene-carboxylic acid hydrazide, treating the hydrazide with nitrous acid to form the corresponding 3-acylamino-2-(ω-substituted alkyl)-4-thiophene-carboxylic acid azide, reacting said acid azide with an alcohol to form the corresponding 3-acyl-amino-4-carboalkoxyamino-2-(ω-substituted alkyl)-thiophene, submitting the latter compound to alkaline hydrolysis to form the corresponding 3,4-diamino-2-(ω-substituted alkyl)-thiophene, and reacting the latter diamino compound with carbonyl chloride to form the corresponding 2′-keto-3,4-imidazolido-2-(ω-R-substituted alkyl)-thiophene, where n is an integer from 1 to 8, R is a radical of the class consisting of —COOH, —COOM, alkoxy, aralkoxy and aryloxy, and M is a salt-forming basic group.

2. The process of preparing a 2′-keto-3,4-imidazolido-2-(ω-carboxyl-substituted alkyl)-thiophene of formula,

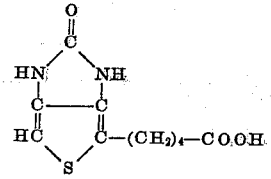

which comprises acylating a 3-amino-4-carboalkoxy-2-(ω-carboxyl-substituted alkyl)-thiophene of formula,

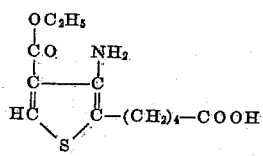

with a benzoic acid acylating agent to form the corresponding 3-benzoylamino-4-carboethoxy-2-thiophenevaleric acid, reacting the latter compound with hydrazine hydrate to eliminate water and form 3-benzoylamino-2-Δ-carboxybutyl-4-thiophenecarboxylic acid hydrazide, treating the hydrazide with nitrous acid to form 3-benzoylamino-2-Δ-carboxybutyl-4-thiophenecarboxylic acid azide, reacting said acid azide with ethyl alcohol to form 3-benzoylamino-2-Δ-carboxybutyl-4-thiophenecarboxylic acid, submitting the latter compound to alkaline hydrolysis to form the corresponding 3,4-diamino-2-(Δ-carboxybutyl)-thiophene compound and reacting the latter diamino compound with carbonyl chloride to form said 2'-keto-3,4-imidazolido-2-(ω-carboxyl-substituted alkyl)-thiophene.

3. The process of preparing a 2'-keto-3,4-imidazolido-2-(ω-phenoxy-substituted alkyl)-thiophene of formula,

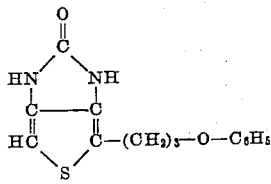

which comprises acylating a 3-amino-4-carboethoxy-2(ω-phenoxy-substituted alkyl)-thiophene of formula,

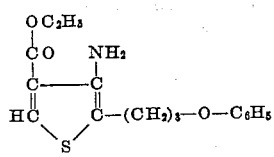

with a benzoic acid acylating agent to form the corresponding ethyl-3-benzoylamino-2-γ-phenoxypropyl-4-thiophene-carboxylate, reacting the latter compound with hydrazine hydrate to eliminate water and form 3-benzoylamino-2-γ-phenoxypropyl-4-thiophenecarboxylic acid hydrazide, treating the hydrazide with nitrous acid to form 3-benzoylamino-2-γ-phenoxypropyl-4-thiophenecarboxylic acid azide, reacting said acid azide with ethyl alcohol to form 3-benzoylamino-4-carbethoxyamino-2-γ-phenoxypropyl-thiophene, submitting the latter compound to alkaline hydrolysis to form the corresponding 3,4-diamino-2-γ-phenoxypropyl-thiophene and reacting the latter diamino compound with carbonyl chloride to form said 2'-keto-3,4-imidazolido-2-(ω-phenoxy-substituted alkyl)-thiophene.

4. The process of preparing a 2'-keto-3,4-imidazolido-2-(ω-benzyloxypropyl)-thiophene of formula,

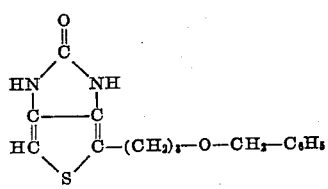

which comprises acylating a 3-amino-4-carboethoxy-2(ω-benzyloxypropyl)-thiophene of formula,

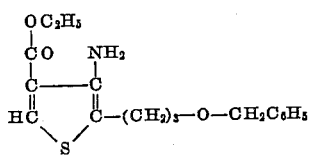

with a benzoic acid acylating agent to form the corresponding ethyl-3-benzoylamino-2-γ-benzyloxypropyl-4-thiophene-carboxylate, reacting the latter compound with hydrazine hydrate to eliminate water and form 3-benzoylamino-2-γ-benzyloxypropyl-4-thiophenecarboxylic acid hydrazide, treating the hydrazide with nitrous acid to form 3-benzoylamino-2-γ-benzyloxypropyl-4-thiophenecarboxylic acid azide, reacting said acid azide with ethyl alcohol to form 3-benzoylamino-2-γ-benzyloxypropyl-4-carbethoxyamino-thiophene, submitting the latter compound to alkaline hydrolysis to form the corresponding 3,4-diamino-2-γ-benzyloxypropyl-thiophene and reacting the latter diamino compound with carbonyl chloride to form said 2'-keto-3,4-imidazolido-2-(ω-benzyloxypropyl)-thiophene.

5. The step which consists of reacting 3,4-diamino-2-thiophenevaleric acid in the form of its alkali metal salt with phosgene to obtain 2'-keto-3,4-imidazolido-2-thiophenevaleric acid.

6. The step which consists of reacting 3,4-diamino-2-γ-phenoxypropyl-thiophene with phosgene to obtain 2'-keto-3,4-imidazolido-2-γ-phenoxypropyl thiophene.

7. The step which consists of reacting 3,4-diamino-2-γ-benzyloxypropyl-thiophene with phosgene to obtain 2'-keto-3,4-imidazolido-2-γ-benzyloxypropyl thiophene.

8. Compounds of the formula,

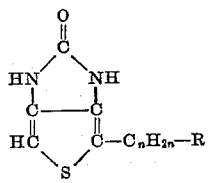

where $n$ is an integer from 1 to 8, R is a radical of the class consisting of —COOH, —COOM, alkoxy, aralkoxy and aryloxy, and M is a salt-forming basic group.

9. A compound of the formula,

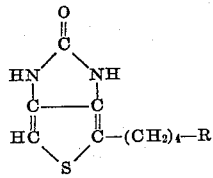

where R is a radical of the class consisting of —COOH, —COOM, alkoxy, aralkoxy and aryloxy, and M is a salt-forming basic group.

10. A compound of the formula,

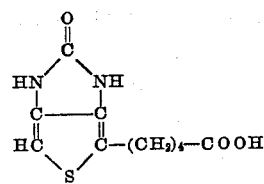

11. A compound of the formula,

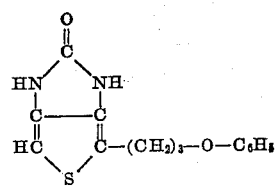

12. A compound of the formula,

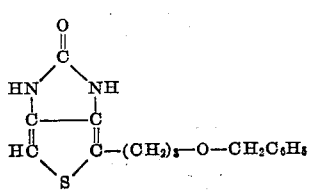

13. The steps which consist of alkaline hydrolysis of 3-benzoylamino-4-carbethoxyamino-2-thiophenevaleric acid of formula,

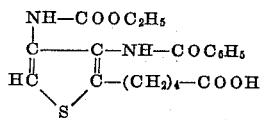

to obtain the corresponding 3,4-diamino compound, and reacting the latter in the form of its alkali metal salt with phosgene to obtain 2'-keto-3,4-imidazolido-2-thiophenevaleric acid.

14. The steps which consist of alkaline hydrolysis of 3-benzoylamino-4-carbethoxyamino-2-γ-phenoxypropyl thiophene of formula,

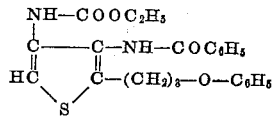

to obtain the corresponding 3,4-diamino compound, and reacting the latter with phosgene to obtain 2'-keto-3,4-imidazolido-2-γ-phenoxypropyl thiophene.

15. The steps which consist of alkaline hydrolysis of 3-benzoylamino-4-carbethoxyamino-2-γ-benzyloxypropyl thiophene of formula,

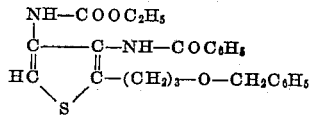

to obtain the corresponding 3,4-diamino compound, and reacting the latter with phosgene to obtain 2'-keto-3,4-imidazolido-2-γ-benzyloxypropyl thiophene.

16. The step which consists of reacting a diamino compound of the formula,

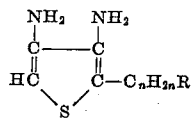

with a carbonyl compound of the formula,

to form a compound having the formula,

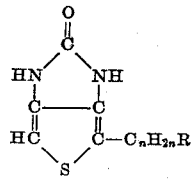

where $n$ is an integer from 1 to 8, R is a member of the class consisting of —COOH, —COOM, alkoxy, aralkoxy and aryloxy, M is a salt-forming basic group and X and Y are members of the class consisting of alkoxy, amino and halogen.

17. The step which consists of reacting a diamino compound of the formula,

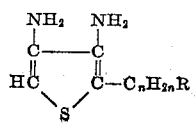

with phosgene to form a compound having the formula,

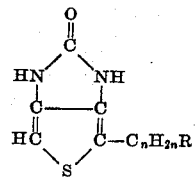

where $n$ is an integer from 1 to 8, R is a member of the class consisting of —COOH, —COOM, alkoxy, aralkoxy and aryloxy, and M is a salt-forming basic group.

18. The steps which consist of alkaline hydrolysis of a compound having the formula,

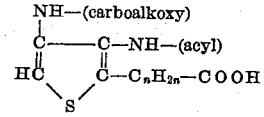

to obtain the corresponding 3,4-diamino compound, and reacting the latter in the form of its alkali metal salt with phosgene to obtain a compound having the formula,

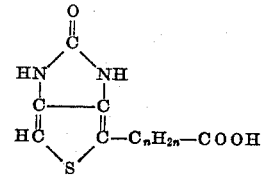

where $n$ is an integer from 1 to 8.

19. The steps which consist of alkaline hydrolysis of a compound having the formula,

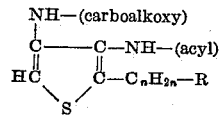

to obtain the corresponding 3,4-diamino compound, and reacting the latter with a barbonyl-containing compound of formula,

to form a compound having the formula,

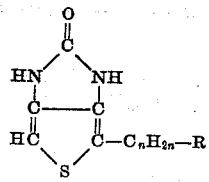

where $n$ is an integer from 1 to 8, R is a member of the class consisting of —COOH, —COOM, alkoxy, aralkoxy and aryloxy, M is a salt-forming basic group and X and Y are members of the class consisting of alkoxy, amino and halogen.

20. The process for preparing a compound having the formula,

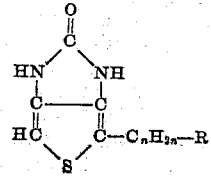

which comprises acylating a 3-amino-4-carboalkoxy-2-(ω-R-substituted alkyl)-thiophene of formula,

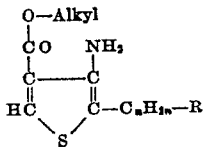

with an organic carboxylic acid acylating agent to form the corresponding 3-acylamino-4-carboalkoxy-2-(ω-substituted alkyl)-thiophene, reacting the latter compound with hydrazine to eliminate water and form the corresponding 3-acylamino-2-(ω-substituted alkyl)-4-thiophene-carboxylic acid hydrazide, treating the hydrazide with nitrous acid to form the corresponding 3-acylamino-2-(ω-substituted alkyl)-4-thiophene-carboxylic acid azide, reacting said acid azide with an alcohol to form the corresponding 3-acylamino-4-carboalkoxy-amino-2-(ω-substituted alkyl)-thiophene, submitting the latter compound to alkaline hydrolysis to form the corresponding 3,4-diamino-2-(ω-substituted alkyl)-thiophene, and reacting the latter diamino compound with a carbonyl-containing compound of formula,

where X and Y are members of the class consisting of alkoxy, amino and halogen thereby obtaining a compound having the formula,

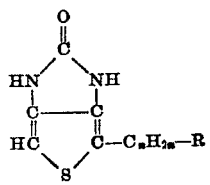

where $n$ is an integer from 1 to 8, R is a radical of the class consisting of —COOH, —COOM, alkoxy, aralkoxy and aryloxy, and M is a salt-forming basic group.

LEE C. CHENEY.
JOHN ROBERT PIENING.

REFERENCES CITED

The following references are of record in the file of this patent:

UNITED STATES PATENTS

| Number | Name | Date |
| --- | --- | --- |
| 2,149,260 | Aaronson | Mar. 7, 1939 |
| 2,367,702 | Van Zoeren | Jan. 23, 1945 |